April 5, 1938.  L. D. SOUBIER  2,113,551
METHOD OF AND APPARATUS FOR WORKING GLASS
Filed Dec. 5, 1933  7 Sheets-Sheet 1

Inventor
Leonard D. Soubier
By J. F. Rule,
Attorney

April 5, 1938.　　　L. D. SOUBIER　　　2,113,551
METHOD OF AND APPARATUS FOR WORKING GLASS
Filed Dec. 5, 1933　　　7 Sheets-Sheet 2
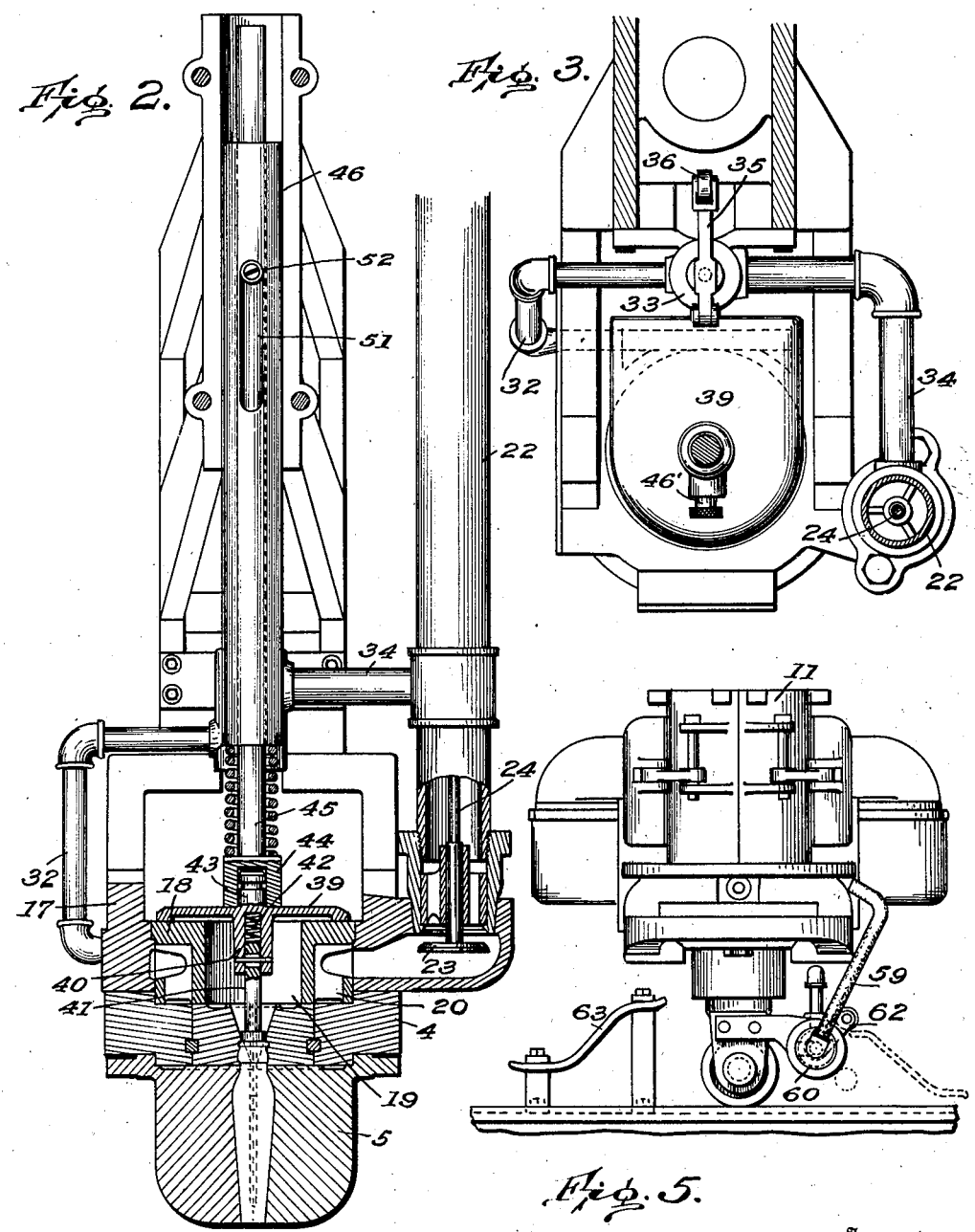
Inventor
Leonard D. Soubier
By J. F. Rule
Attorney

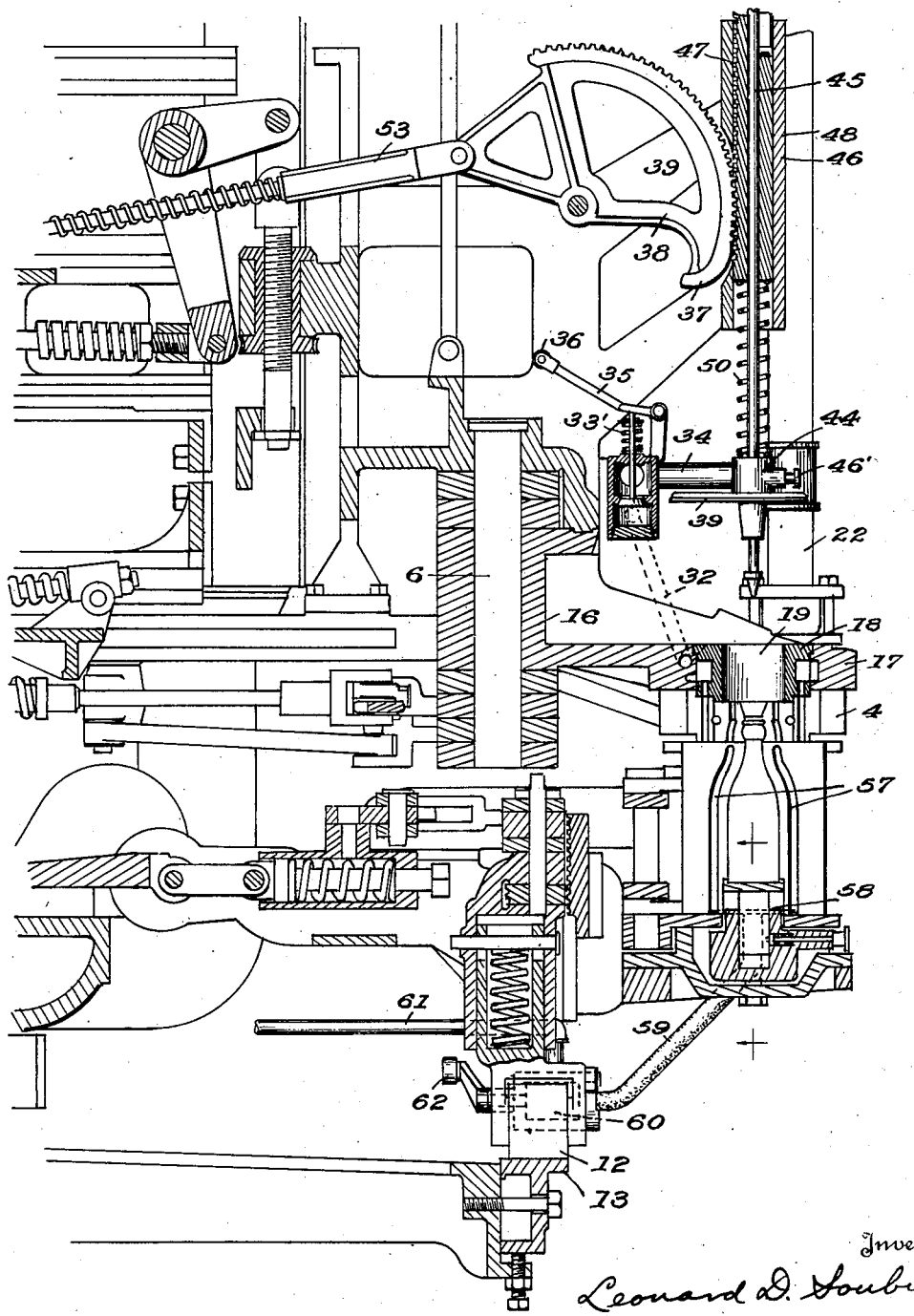

April 5, 1938. L. D. SOUBIER 2,113,551
METHOD OF AND APPARATUS FOR WORKING GLASS
Filed Dec. 5, 1933 7 Sheets-Sheet 4
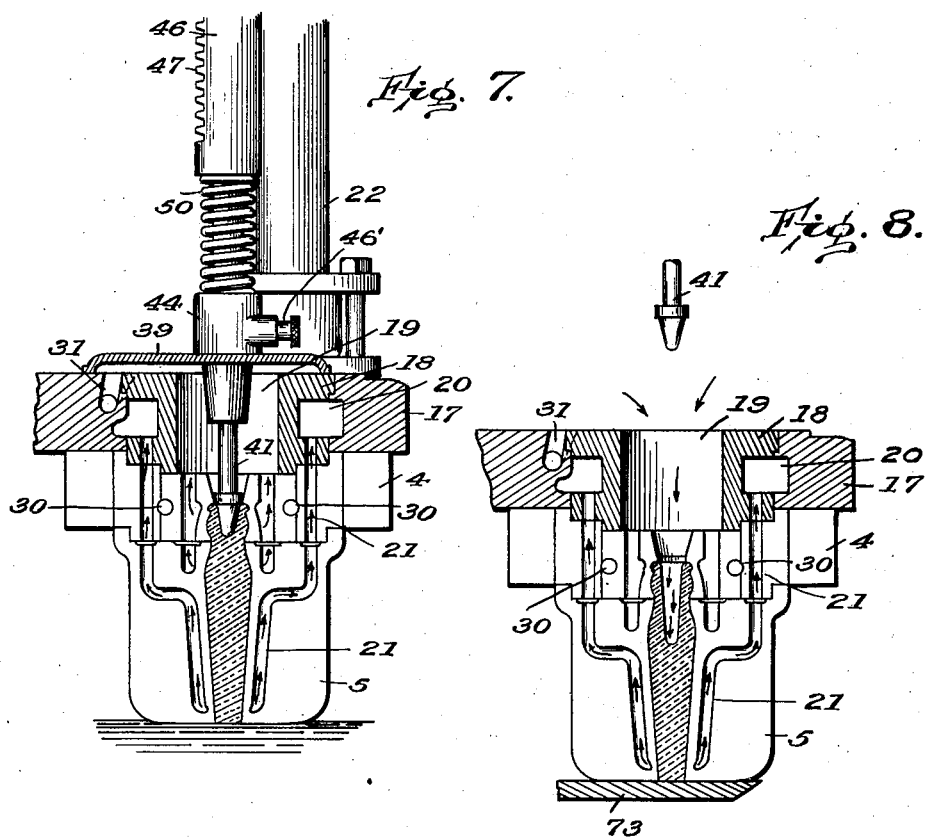
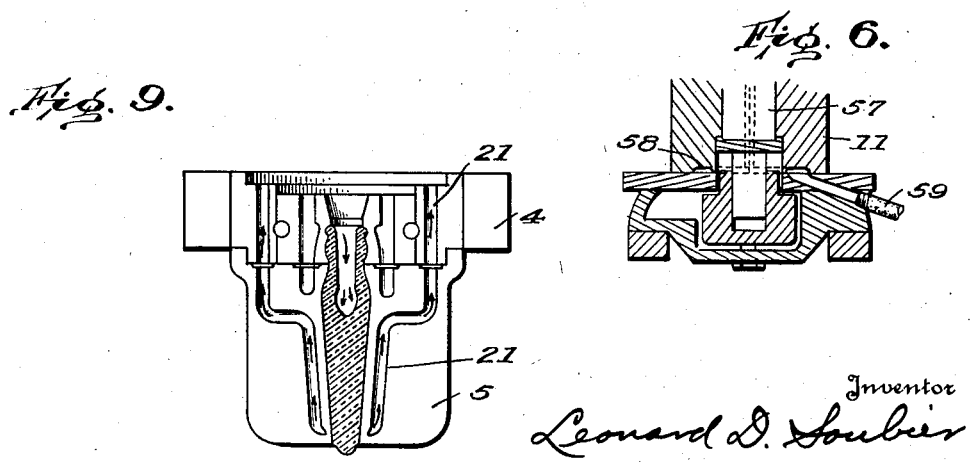
Inventor
Leonard D. Soubier
By J. F. Rule.
Attorney April 5, 1938.   L. D. SOUBIER   2,113,551
METHOD OF AND APPARATUS FOR WORKING GLASS
Filed Dec. 5, 1933   7 Sheets-Sheet 6

Inventor
Leonard D. Soubier
By J. F. Rule,
Attorney

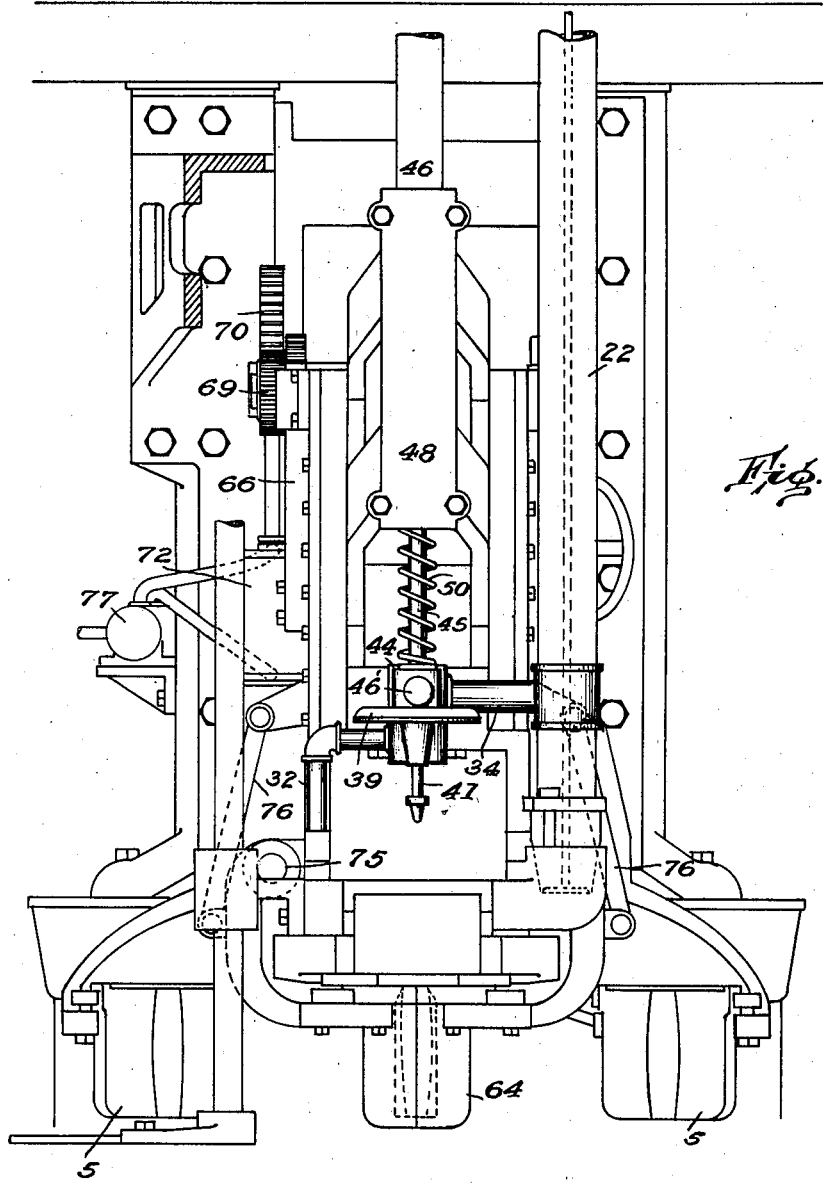

Patented Apr. 5, 1938

2,113,551

UNITED STATES PATENT OFFICE 2,113,551

METHOD OF AND APPARATUS FOR WORKING GLASS

Leonard D. Soubier, Toledo, Ohio, assignor to Owens-Illinois Glass Company, a corporation of Ohio Application December 5, 1933, Serial No. 701,061

5 Claims. (Cl. 49—5)

The invention relates to a method of and apparatus for shaping molten glass into a finished article.

Certain types of automatic glass working machines include the common practice of charging a blank and associated neck mold with a mass of molten glass, a neck pin or plunger being inserted within the neck mold during the charging thereof. Following the charging, the glass is compacted or settled by air under pressure within the blank mold in order to force the glass into intimate contact with the walls of the molds, thereby shaping the glass into the desired form. The neck pin is withdrawn from the neck mold, a baffle applied to the open end of the blank mold, and air under pressure admitted into the opening formed by the neck pin so as to blow the mass of glass to the form of the blank mold. Following the preliminary treatment of the glass blank in the blank mold, it is transferred to a finishing mold where by means of air under pressure the blank is further and finally blown into the shape of the finished article.

In other types of glass working machines, the glass is gathered by suction into a blank mold, this charge being severed from the main supply by a cut-off knife, said knife thereafter acting as a baffle plate for the open end of the mold. The plunger is then withdrawn, a blow head placed in position and air under pressure is admitted through the opening formed by the plunger to force the glass out into contact with the walls of the blank mold. Following this, the blank of glass is transferred to the finishing mold and blown to final form by the introduction of air under pressure through the neck end of the blank.

In manipulating glass at working temperature, when a cold piece of metal or other material is applied to the surface of the glass, it chills said surface and forms upon the glass an enamel or skin. This chilled surface portion of glass contracts and shrinks away from the cold metal and remains out of intimate contact therewith unless some force is applied to cause the glass to remain in contact with said metal.

In the formation of a glass blank or parison in any form of machine, an object is to impart to the gathered glass an enamel or skin formation of sufficient rigidity to support the blank during its transfer from the blank forming mold to the final mold and to form this enamel in the shortest possible time. Any interruption or discontinuance of intimate contact of the glass with the mold walls during the period of formation in the blank mold increases the time required to complete the blank and correspondingly reduces the amount of ware produced, and moreover tends to produce uneven enamel formation on said blank.

In the two common types of machines above mentioned, the method of operation prevailing in the formation of the blank is such that there is a very appreciable length of time during the formative period when there is no means active to retain the glass in intimate contact with the mold walls. There is therefore present a condition wherein uneven chill may be imparted the blank enamel, as well as making it imperative that the blank be retained in the mold for a comparatively long forming period in order to insure its being sufficiently rigid for transferring to the final mold.

Further, these forming operations described in the types of machines referred to require the use of special types of blow heads and actuating mechanism therefor, counterblow baffles, and various adjustments must be provided for these parts so as to adapt the machine for the shaping of articles of various dimensions. The movements of these pressure blow heads, baffles, etc., into and out of cooperative position with the molds must be co-ordinated with the other instrumentalities of the machine and timed in respect thereto so that they may perform their functions in the proper relation and at the proper time or as close thereto as possible in the cycle of the machine.

Also in fashioning articles of some types, difficulty may arise in providing for a proper final blowing period or the time of initiation of cessation thereof. If the blowing period cannot be adjusted properly the article will not be blown to the desired extent in the finishing mold or it may fail to obtain the proper "set" before the finishing molds are opened, thus causing the loss of finished articles due to their going out of shape. The movements of the blow heads into and out of position for the several blowing operations necessarily involve time intervals which, even though short, restrict the productive capacity of the machine, and in some cases may actually restrict the blowing time to a point where articles of superior quality or finish cannot be produced. It is found in practice that the average time required for such movements of the blow heads during the period of forming the blanks is on certain types of machines which are extensively used, equal to approximately twenty-five per cent. of the forming period.

The present invention seeks to avoid the difficulties above described. Instead of using blow heads, actuating mechanism therefor including various adjustable features, pressure air lines, and other features involving time consuming operations, a sub-atmospheric condition is created within the blank and blow molds by connecting them at the proper time with a source of vacuum. The creation and maintenance of this condition within the neck, blank, and finishing molds will produce an expansion of the blank by atmospheric pressure. Under these conditions, the blank will be fashioned properly in the molds, the time allotted for expansion of the blank therein can be lengthened or varied, and the blank while being worked in the molds will be maintained in intimate contact with the walls thereof, thereby permitting the required abstraction of heat in order to produce a proper "set" to the glass being worked. This abstraction of heat is obtained in the shortest possible time interval, due to the continuity of the intimate contact of the glass with the mold. It will be apparent, therefore, that the necessary time element for the actuation of pressure blowing heads into and out of blowing position is dispensed with. This results in simplification of mechanism, increased efficiency of operation, and improved quality of the ware produced.

In utilizing the present invention the finishing mold can be moved to any desired position without requiring a corresponding movement of a pressure blowing head and its associated mechanism. The blowing time in the finishing mold can also be varied or increased materially and caused to extend, if desired, to a point where the blank will continue under final blowing while a second charge is being obtained and preliminarily shaped by the same blank mold which obtained the charge undergoing final blowing.

A further feature of the invention relates to the provision of a novel method and means by which the molds are held tightly closed during the expansion of the glass therein, thus eliminating from the finished ware the usual seams which are formed on the surface of the blown articles along the meeting edges of the molds and which appear as defects in the finished ware. In machines of the type above indicated, in general use at the present time, there is always a tendency for the molds to be spread apart during the blowing operations by the super-atmospheric pressure applied internally of the molds. This involves mechanical complications and special mechanisms for holding the molds closed when subjected to the blowing pressure, and such mechanisms at best frequently fail to maintain the molds tightly closed, resulting in the above noted surface defects in the finished ware. With the present invention this difficulty is overcome by the provision of a partial vacuum or suction applied between the meeting faces of the molds, which tends to hold the mold sections tightly together, and as the atmospheric pressure on the interior and exterior surfaces of the mold is balanced during the expansion of the glass in the mold, the suction operates effectively to hold the mold sections tightly closed, and that without the need of special mechanism for such purpose.

While the invention herein disclosed is shown as applied to a rotary suction gathering machine of the Owens type (details of which may be found in the U. S. patent to Richard La France, No. 1,185,687, patented June 6, 1916), it will be understood the invention is not restricted to such type of machine but may be applied with equal facility to those types of glass shaping machines in which the blank mold is charged from above, whether they be of single or multiple table type.

Details of the method and apparatus set forth above will be hereinafter more fully disclosed, reference being had to the accompanying drawings, in which:

Fig. 2 is an enlarged detail showing the neck and blank molds and associated mechanisms in the positions they occupy at the time of charging the molds with molten glass.

Fig. 3 is a plan view partly in section of the mechanism shown in Fig. 2.

Fig. 4 is a view similar to Fig. 1 showing the finishing mold in the position it occupies during the finish blowing operation.

Fig. 5 is a detail view of the finishing mold and the vacuum line associated therewith, viewed radially inward of the machine.

Fig. 6 is a sectional view through the lower end of the finishing mold illustrating the bottom plate and the vacuum conduits.

Fig. 7 is a detail view showing the position the blank and neck molds and associated mechanism occupy when obtaining a charge of glass from a molten bath.

Fig. 8 illustrates a formative stage of the blank in the blank mold with the cut-off knife serving to close the lower end of the blank mold and atmospheric pressure serving to compress the glass within the mold and enlarge the mouth opening.

Fig. 9 illustrates a further formative stage of the blank following the withdrawal of the cut-off knife.

Fig. 10 is a timing chart suggesting the time of occurrence of the several steps performed in the fabrication of an article.

Fig. 14 is a front elevation showing particularly the supplemental parison mold and its operating mechanism.

Figure 1:
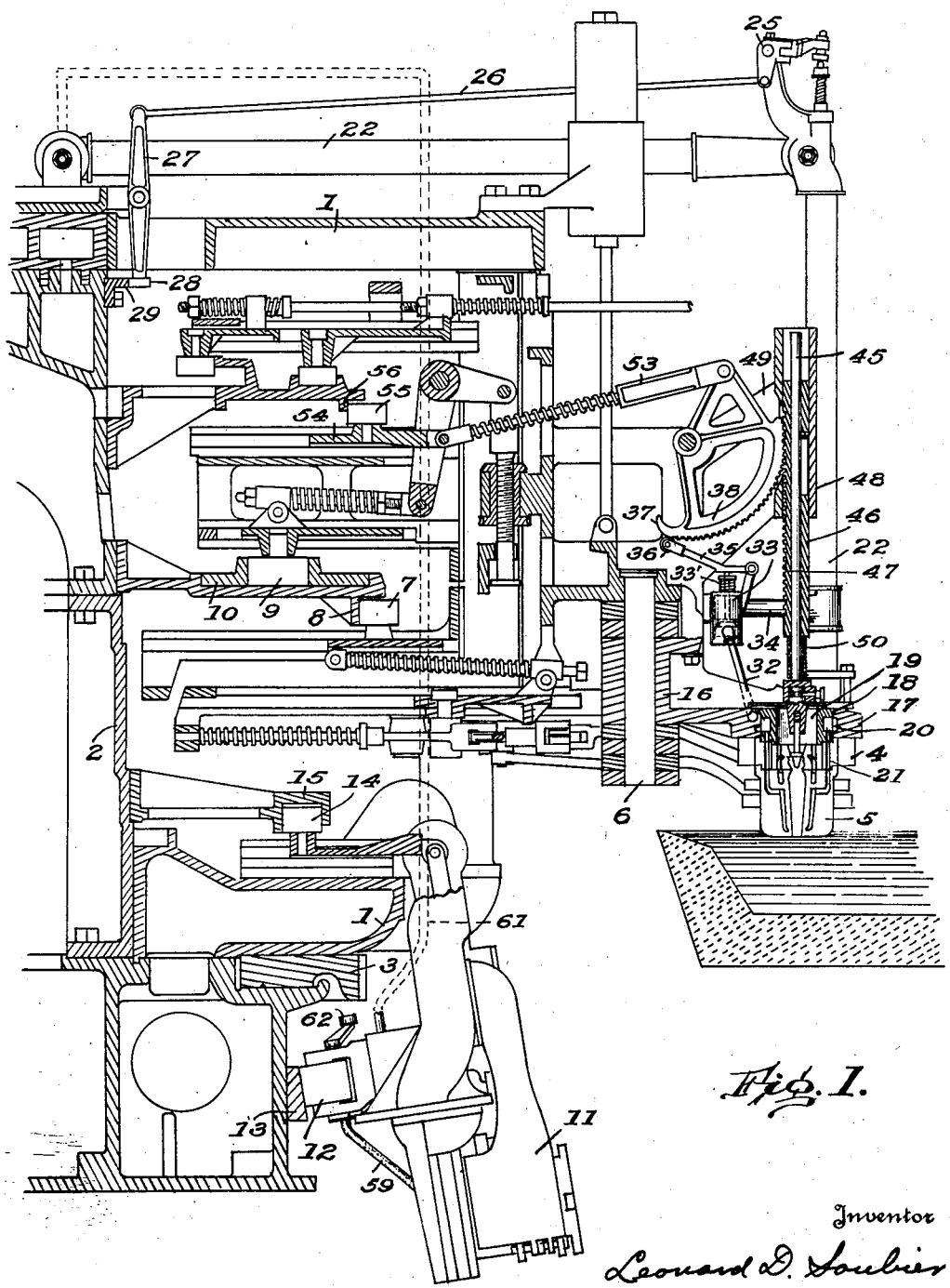
Fig. 1 is a sectional elevation of a portion of the well-known Owens machine having the present invention applied thereto.
Figure 70:
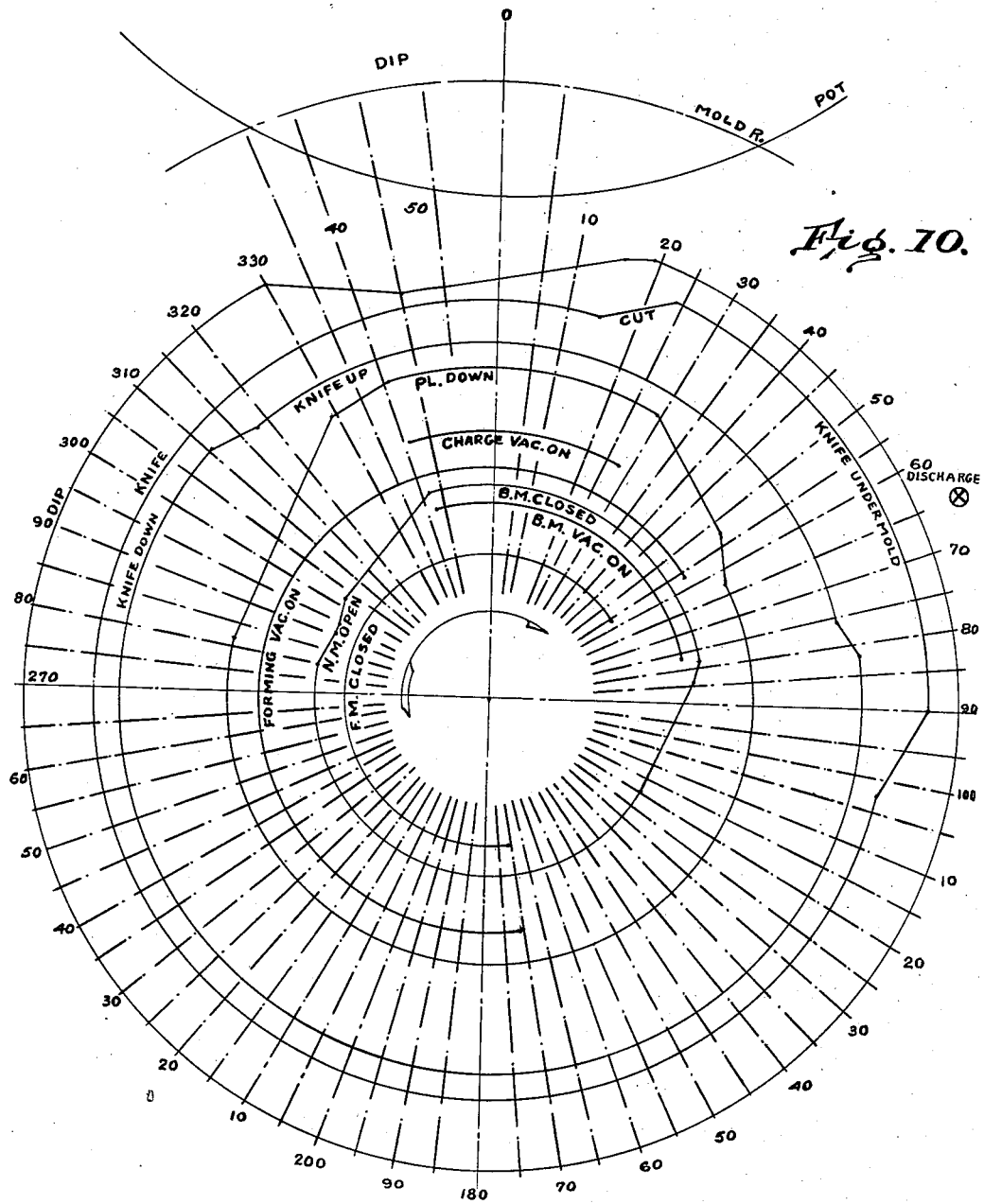

The Owens type of machine comprehends a plurality of arms which constitute broadly individual gathering and glass forming units. Each unit is carried by a frame I which revolves about a stationary pillar 2. The frame I of the machine is caused to rotate through a ring gear 3 and appropriate drive gearing. The central pillar 2 carries a plurality of stationary cams which cooperate with the moving units to cause various movements of the several parts of the machine. Inasmuch as the several units of the machine are identical in structure and function and are utilized to perform the same steps, a description of a single unit will suffice for all.

Each unit includes a neck mold 4 and a blank mold 5, each having separable halves. The neck and blank molds are mounted upon and for opening and closing movements about the vertical arbor or pintle 6 carried by the frame 16. The neck mold and blank mold are opened and closed by suitable linkage and a slide carrying a roller 7. This roller, during the travel of the unit, is actuated by the stationary cam 8.

The neck mold and blank mold are dipped or lowered slightly in order to enter the gathering pot for the gathering operation and thereafter raised to clear the pot. This raising and lowering of the molds for the gathering operation is effected through suitable linkage and a roller 9 which is actuated by the stationary cam 10 when the unit travels about the vertical axis of the machine.

Each unit includes also a finishing mold 11 having separable halves arranged for opening and closing movements. The finishing mold travels with the frame 1 about the vertical axis of the machine and is mounted for raising and lowering movements about a horizontal pivot by means of the roller 12 and stationary cam 13. The finishing mold sections are opened and closed by a suitable linkage including the roller 14 which is actuated during the travel of the frame by the stationary cam 15.

A bracket 16, supported in vertical slideways on the frame 1, carries the pintle 6 and the neck and blank molds and extends radially outward from said pintle. The outer end of the bracket takes the form of an annular housing 17 and supports a bushing or sleeve 18. The aperture 19 of the bushing is axially alined with the cavities of the neck and blank molds when in closed position.

The housing 17 and bushing 18 are provided with suitable vacuum ports or conduits 20. Vacuum conduits 21, in communication with the ports 20, extend downwardly through the lower portion of the bushing through the neck mold and downwardly into the blank mold as shown in Fig. 7. The vacuum conduits 20 and 21 are in communication with the vacuum line 22, see Figs. 1 and 2, which extends upwardly and then inwardly to the vacuum source. This vacuum line contains a valve 23 mounted on the lower end of a push rod 24, see Fig. 2. This push rod is actuated, through a bell crank 25 and associated mechanism, by a link 26, the inner end of which is connected to a lever 27 which carries at its lower end the roller 28. A stationary cam 29, during the rotation of the frame 1, causes the opening and closing of the vacuum valve at the desired time.

An independent series of ports or conduits 30 are in communication with the aperture 19 and may extend downwardly through the neck mold to the upper portion of the blank mold as shown in Fig. 7. The conduits 21 are spaced a sufficient distance, in passing through the neck mold and the upper portion of the blank mold, to permit the conduits 30 to occupy a position adjacent the neck and blank mold cavities.

A vacuum conduit or port 31 is formed in the housing with one end exposed as shown in Fig. 7. The other end of the conduit 31 is connected to a pipe 32 which leads to the valve 33. This valve is also connected to a pipe 34 which communicates with the main vacuum line 22 as shown in Figs. 2 and 3. The valve 33 is closed by a spring 33' and opened by an arm 35, the remote end of which carries a roller 36 for engagement with the cam surface 37 formed on the lower end of the gear segment 38.

A cover or valve 39 having a downwardly extending annular flange is located above the bushing 18 and housing 17 and is movable toward and into contact with the same for sealing engagement and away therefrom in order to expose the aperture 19 to the atmosphere. A boss 40 extends downward from the cover or valve and receives the stem of the plunger or mouth-forming pin 41. A spring 42 is interposed between the plunger and the boss in order to provide a resilient seating of the plunger in the neck mold for its glass shaping operation. The valve 39 is removably secured within the housing 44 on the lower end of the rod 45 by the stud 43 and spring detent 46'.

The rod 45 passes through a sleeve 46, the outer surface of which is formed into a rack 47 which engages a gear segment 38. The sleeve 46 is guided for raising and lowering movements within the guide 48 formed in the outer end of a bracket 49 which is supported by the main frame 1. A coil spring 50 surrounds the rod 45 and is interposed between the lower end of the sleeve 46 and the upper end of the housing 44. The sleeve 46 is provided with a slot 51 for the receipt of a pin or roller 52 carried by the rod 45. The pin and slot connection between the rod 45 and sleeve 46 is such that when the sleeve 46 is lowered to move the valve 39 and plunger 41 downwardly, through the spring 50, the valve and plunger will be held in their lowermost positions by the upper edge of the slot 51 engaging the pin 52. Upon the raising of the sleeve 46 the springs 42 and 50 are relieved, allowing the valve 39 to crack open admitting atmospheric pressure to the aperture 19. Further upward movement of the sleeve 46 causes the lower surface of the slot to engage the pin 52 and lift the rod 45, thereby raising the valve 39 and plunger to their uppermost positions and clear of the housing 17 as shown in Fig. 4.

The circular gear segment 38 is attached by a yielding connection 53 to a slide 54 which carries a roller 55. This roller is actuated by a stationary cam 56 fast to the pillar 2. By a proper shaping of the cam 56 the raising and lowering motions of the valve 39 and plunger 41 can be made to occur at the desired time. This cam 56, through the connections just described and the surface 37 on the circular gear segment 38, also serves to actuate the valve arm 35 of the vacuum valve 33.

A cut-off knife 73 is arranged to work across the bottom surface of the blank mold to sever the glass in the mold from that in the bath following the charging of the mold and upon the lifting thereof. The actuation of this knife should be such that it will remain in contact with the bottom surface of the blank mold and effectually close the same in order to aid in a shaping of the glass within the blank mold. Mechanism for actuating this cut-off knife is disclosed in the La France Patent No. 1,185,687, herein referred to.

The finishing mold 11 is provided with vacuum conduits 57 as shown in Figure 4, and these conduits are in communication through the annular passage 58 with the pipe 59, the latter leading to the valve 60 carried by the finishing mold support. This valve also communicates with a pipe 61 which leads to the vacuum source—see Figs. 1 and 4. The valve 60 is provided with an actuating arm 62 which is moved to open and close the valve at the proper time by suitable stationary cams 63 upon the travel of the mold about the vertical axis of the machine.

Figure 11:
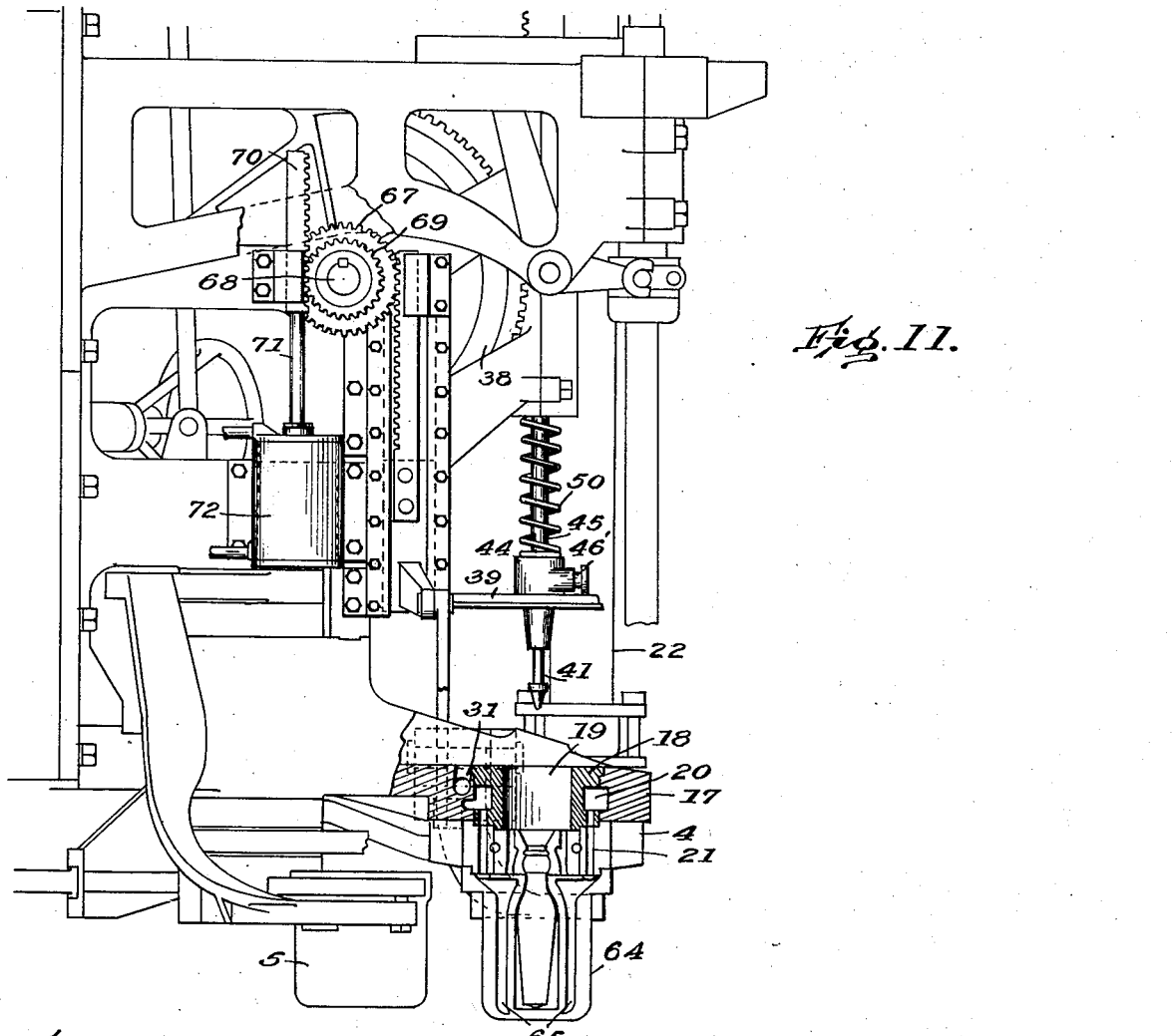
Fig. 11 illustrates the use of a supplemental or second blank mold and mechanism for opening and closing the same.

It may be desirable in some instances to impart to the glass blank a further working, by way of preliminary treatment prior to its delivery to the finishing mold. This may be accomplished by utilizing a second or supplemental blank mold 64 as shown in Fig. 11. This mold 64, like the blank mold 5, is provided with vacuum conduits 65 which extend substantially throughout the height of the mold. The upper portions of the conduit are so arranged and shaped that they will communicate with the conduits 21 formed in the neck mold when the neck mold and the supplemental blank mold are closed and in cooperative relation. When these molds are closed as shown in Fig. 11, the conduits 65 and 21 are in communication with the vacuum line 22 and subject to the influence of the valve 23. The supplemental mold 64 is by preference opened and closed by moving the halves in a vertical plane about horizontal pivots 75 (Fig. 14). The opening and closing of the mold halves may be occasioned, through suitable connections 76, by a rack 66 driven by a gear 67 fast to a shaft 68. A gear 69 is also fast to the shaft 68 and is engaged by a rack 70 attached to the upper end of a piston rod 71 of a piston motor 72. This motor is controlled by a valve 77 actuated by mechanism (not shown) so as to cause opening and closing of the supplemental mold 64 at the desired time.

It will be understood that the mating surfaces of the neck, blank, and finishing molds are relieved in order to provide proper communication between the shaping cavities of the mold and the vacuum conduits.

The several steps of the method and operation of the mechanical instrumentalities employed will now be described. Considering one of the glass working units to be rotating about the central vertical axis of the machine and the neck and blank molds closed and in cooperative relation with each other and with the housing 17, on approach to a position over the gathering pot the sleeve 46 is depressed by the rotation of the segmental gear 38, through cam 56, thus causing the cover or valve 39 to be lowered in sealing engagement with the housing 17 and the plunger 41 to be moved to its lowermost position within the neck mold, see Fig. 2.

The rotation of the segmental gear 38 also causes the cam surface 37 thereon to engage the arm 35 of the vacuum valve 33 and open the same. The opening of this valve connects the vacuum supply line 22 through pipes 34 and 32 with the conduit 31. Since the cover or valve 39 is in sealing engagement with the housing 17, the vacuum line is continued between the cover or valve 39 and bushing 18 and is in communication with the aperture 19 and the conduits 30 formed in the neck and blank molds, see Fig. 7. As the above operations are occurring, the valve 23 in the vacuum line 22 is opened through its operating connections which include the link 26, lever 27, and stationary cam 29, thus establishing communication between vacuum line 22 and the conduits 20 which in turn communicate with the conduits 21 extending downwardly through the neck and into the blank molds, see Figs. 2 and 7. The vacuum, or suction, when established in the conduits 21 of the blank molds, may continue until a time just prior to the opening of the blank molds when it is discontinued by a closing of the valve 23.

The above operations occur at the dipping of the blank mold into the molten bath for the gathering operation. This dipping or lowering of the molds is occasioned by the travel of the unit in respect to the stationary cam 10. As soon as the blank mold is slightly immersed in the molten bath, the glass is drawn upwardly into the blank mold and neck mold and around the plunger or mouth forming pin 41 as shown in Fig. 7.

As soon as the blank mold is charged with molten glass, it is raised to clear the bath, and the cut-off knife 73 moves across the bottom surface of the blank mold severing the glass string connecting the glass in the mold with that of the bath. The cut-off knife 73 is maintained in contact with the lower surface of the blank mold and serves to close the same, see Fig. 3.

A sufficient amount of time should be allowed to permit the proper chilling of the glass in contact with the neck mold and plunger in order to form properly the upper end of the article. The vacuum valve 33 is then permitted to close under the influence of its spring by the reverse rotation of the segmental gear which removes the cam 37 from the valve arm. The closing of this valve arrests the communication of the ports 30 in the blank and neck molds, aperture 19, conduit 31, and pipe 32 with the main vacuum line 22.

Continued rotation of the segmental gear 38 with the consequent raising of the sleeve 46 causes a slight lifting or "cracking" of the cover or valve 39, thus exposing the aperture 19 to the atmosphere. Further upward movement of the sleeve 46 serves to raise the plunger or mouth forming pin 41, thus exposing the mouth opening formed in the blank. The presence of air at atmospheric pressure coincident with the lifting of the plunger 41 tends to eliminate any collapse of the blank in the region of its mouth opening. Inasmuch as vacuum is being maintained within the blank mold through the conduits 21 in communication with a main vacuum line 22, air at atmospheric pressure will enter the mouth opening formed in the glass blank coincident with the lifting of the plunger, thus initiating an expansion or compression blowing of the blank without loss of time.

The cut-off knife, following the severing operation, serves as a closure for the lower end of the blank mold, see Fig. 8, and remains in this position in order to aid the expansion or compression blow, but is removed at a time sufficiently early to prevent undue chilling of the lower end of the blank. The removal of the cut-off knife leaves the lower end of the blank exposed for a short time prior to the opening of the blank mold and tends to permit a sagging of the blank below the lower edge of the mold as shown in Fig. 9. The removal of the knife serves to induce a reheating of the end of the blank chilled thereby and permits a further enlargement of the opening formed in the blank, see Fig. 9.

The vacuum or suction which has been continuously maintained in the blank mold by virtue of the conduits 21 is discontinued by closing the valve 23 in the main vacuum line 22, and the blank mold is then opened to expose the blank.

The open finishing mold having been raised by the cam 13 is closed, by the cam 15, about the blank suspended from the neck ring. Following the closing of the finishing mold, the vacuum valve 60 is opened by its operating cam 63, thereby placing the finishing mold in communication with the vacuum line 61 as previously described. After a sufficient lapse of time the neck mold is opened leaving the glass blank supported solely in the finishing mold, and returned to its position for cooperation with the blank mold upon the movement of the unit toward the gathering pot. The expansion of the blank in the blow mold by atmospheric pressure will continue, however, owing to the vacuum connections herein described.

The sub-atmospheric condition created and maintained in the finishing mold induces a final expansion of the blank in the finishing mold under atmospheric pressure and serves to insure, at all times, an intimate contact of the glass with the walls of the mold. Inasmuch as air pressure blow heads are not required, the movements of which must be coordinated with other mechanisms, the final blowing time may be varied or lengthened materially, thus providing a range of flexibility which cannot always be obtained by the use of such heads.

Blowing or expansion by atmospheric pressure in the finishing mold can be used to advantage in the Owens type of machine due to the fact that it allows a mechanical arrangement which lends itself to long continued application of such blowing or expansion. Ordinarily, the blowing time through an air pressure head is so regulated that finish blowing is terminated on approach of the mold to the gathering pot because the finishing mold must lower or dip in order to pass beneath the pot. By utilizing the present invention the finish blowing time may be fixed without regard to a dipping of the finishing mold and may continue while the finishing mold is in lowered position. The ability to vary or increase materially the finish blowing time is also of importance in that it permits the finish blowing of a blank while the companion blank mold of the unit is obtaining a second or succeeding charge, thereby materially increasing the productive capacity of the machine. The final expansion in the finishing mold is terminated by closing the vacuum valve 60, thereby discontinuing the application of vacuum to the finishing mold conduits. Thereafter, the finishing molds are opened for the removal of the completed article.

By utilizing the vacuum conditions herein described, it will be observed that a differential pressure is exerted in the neck mold during the gathering or obtaining of the blank, during the expansion or compression of the blank in the blank mold, and during the expansion of the blank in the finishing mold. This condition may be maintained to hold the glass in intimate contact with the mold walls from the time the glass enters the molds until a time just preceding the mold opening.

Figure 12:
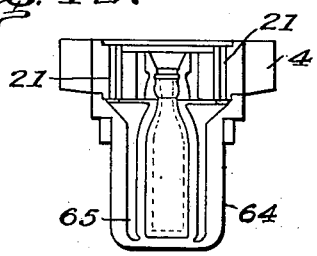
Fig. 12 is a diagrammatic view showing the partial formation of the article in the supplemental or second blank mold.
Figure 13:
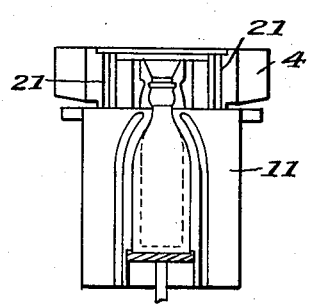
Fig. 13 is a view similar to Fig. 12 illustrating the final expansion of the glass in the finishing mold.

As previously described, a supplemental or second blank mold 64 may be utilized to impart a further preliminary treatment to the blank prior to its delivery to the finishing mold. When a supplemental blank mold is to be used, the vacuum condition maintained in the conduits 21 of the blank mold 5 is discontinued by closing the valve 23, the blank mold then opened, and the halves of the supplemental mold 64 moved to closed position about the blank suspended from the neck mold, see Figs. 11 and 12. The conduits 65 in the supplemental mold 64 are in communication with the conduits 21 formed in the neck mold. Vacuum is established within the mold 64 by opening the valve 23. The blank is then further expanded to the shape of the supplemental mold by atmospheric pressure. At the desired time the valve 23 is closed, thereby discontinuing the vacuum condition within the supplemental mold 64, the mold opened, and the finishing mold raised and closed about the blank for the finish blowing operation as heretofore described.

It will be understood that the cycle of operations diagrammatically represented in the time chart of Fig. 10 can be varied or modified as occasion may require without departing from the spirit of the invention. Likewise, the method herein disclosed may be effectually carried out in those types of machines wherein the blank mold is charged from above, and the disclosure of the present invention as applied to the Owens type of machine is not to be construed as a limitation thereof.

What I claim is:

1. The method of forming a hollow glass article which consists in exhausting air from a blank and neck mold arranged in cooperative relation with a mouth forming pin projecting into the neck mold to settle a charge of glass admitted to said molds and form the same therein and about the mouth forming pin, withdrawing said pin to expose the mouth opening in the glass blank to the atmosphere, thereby admitting air at atmospheric pressure to the mouth opening to expand the blank in the blank mold and enlarge the mouth opening, discontinuing the exhaustion of air within the blank mold and freeing the blank from said mold, delivering the blank to a finishing mold, and expanding the blank therein by exhausting air from the finishing mold.

2. The method of forming a hollow glass article which comprises exhausting the air by suction from a mold while the latter is associated with a supply body of molten glass and thereby causing glass to enter the mold cavity and form a blank therein, forming an opening in the blank as the glass enters the mold, and exposing said opening to the atmosphere before the application of suction to the mold cavity is discontinued to thereby enlarge the opening and compact the blank.

3. In a glass working machine the combination of a blank mold and a neck mold arranged for cooperative relation to form a glass blank, means for creating a sub-atmospheric condition within the blank mold and neck mold, a mouth forming pin, means for projecting the pin into the neck mold and withdrawing it therefrom during the creation of a sub-atmospheric condition in the blank mold, and means for exposing the neck mold to the atmosphere prior to the withdrawal of said pin.

4. The method of producing a glass parison intended for expansion to the form of a hollow container, which consists in exhausting the air by suction from a body blank mold and a neck mold while said molds are in juxtaposition and associated with a supply body of molten glass and thereby causing a charge of glass to enter the molds, forming an axial opening in the neck end of the charge of glass, closing the end of the body blank mold remote from the neck mold, and effecting a uniform enlargement of said opening and compacting of the glass solely through a continuation of the air exhausting operation and exposure of said opening to the atmosphere.

5. The method of producing a glass parison intended for expansion to the form of a hollow container, which consists in exhausting the air by suction from a body blank mold and a neck mold while said molds are in juxtaposition and associated with a supply body of molten glass and thereby causing a charge of glass to enter the molds, forming an axial opening in the neck end of the charge of glass by a removable mechanical device, closing the end of the body blank mold remote from the neck mold, and effecting a uniform enlargement of said opening and compacting of the glass solely through continuation of the air exhausting operation and removal of said mechanical device, whereby to expose the opening to the atmosphere.

LEONARD D. SOUBIER.